UNITED STATES PATENT OFFICE.

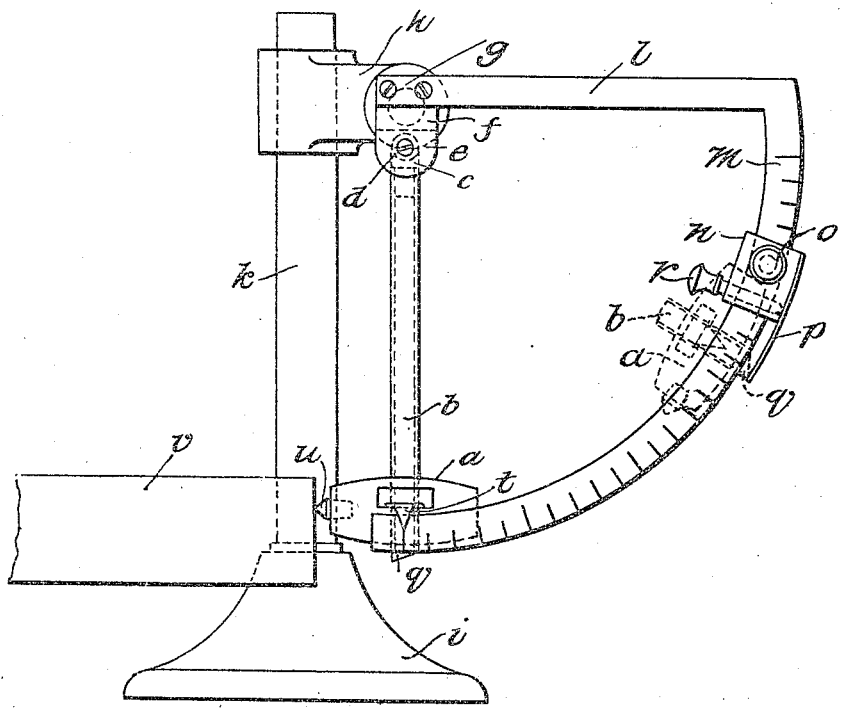

JOSEF KIRNER, OF STUTTGART, GERMANY, ASSIGNOR TO NORMA COMPAGNIE G. M. B. H., OF CANNSTATT-STUTTGART, GERMANY.

APPARATUS FOR TESTING HARDNESS.

1,057,850.

Specification of Letters Patent.

Patented Apr. 1, 1913.

Application filed December 30, 1910. Serial No. 600,177.

*To all whom it may concern:*

Be it known that I, JOSEF KIRNER, a subject of the German Emperor, residing at Stuttgart, in the Empire of Germany, have invented certain new and useful Improvements in Apparatus for Testing Hardness, of which the following is a specification.

This invention has for its object an apparatus for testing hardness. The apparatus acts by the force of the rebound of a falling weight, which strikes the article to be tested, and serves as measure of comparison for the degree of hardness. According to this invention the falling weight is suspended pendulum fashion, so that it can fall from a given height against the article to be tested which is arranged at the lowest point of the pendulum path, and rebound therefrom, the height to which it rebounds, which serves as a measure of the hardness, being read off on a scale.

An example of construction of the invention is shown in side view in the accompanying drawing.
The drop-weight $a$ is suspended by means of a tube $b$ from the axle $c$, which is prolonged into points $d$ at both ends, which may be screwed into lateral cheeks $e$ of a U-shaped frame or yoke $f$. The frame or yoke $f$ is fixed by a bolt $g$ to the socket $h$ mounted on a column or pillar $k$ and having a base or foot $i$. A quadrant $m$, provided with a scale on which a slide-piece $n$ can move and be fixed by a set-screw $o$, is secured to the yoke $f$ by means of a horizontal arm $l$. A spring $p$ fixed on the slide-piece $n$ engages by means of a bent up end behind a nose or projection $q$ on the drop-weight $a$, which is shown raised in the dotted position, and this spring may be bent backward or depressed by a pressure pin $r$, whereby the nose $q$ is released and the weight can drop. In the lowest position of the pendulum path of the drop-weight, a hardened pin $u$ fixed on the latter encounters the article $v$ to be tested, whereupon the drop-weight is caused to rebound more or less strongly according to the hardness of the article. The height reached on this rebound, which may be conveniently read off by an index $t$ traveling over the scale of the quadrant $n$, thus affords a measure of the degree of hardness of the article tested.

The apparatus is particularly adapted for testing bar material the pin $u$ striking against the end thereof. By a suitable formation of the base or foot $i$ the apparatus may also be directly placed on the bar to be tested, so that it is possible to test heavy bars as regards hardness rapidly and conveniently at their place of storage.

I declare that what I claim is:—

1. Apparatus for testing hardness comprising a drop-weight, means for swingingly supporting said weight, a quadrant fixed on said means, means for indicating on the quadrant the extent of the rebound of the weight from the material to be tested, a slide member on the quadrant, resilient means on the slide member to engage the weight, and depressible means slidably carried by the slide member to engage said resilient means and disengage the latter from the weight.

2. Apparatus for testing hardness, comprising a support, a drop-weight swingingly mounted on the support, a quadrant carried by said support on one side of the weight, an indicator mounted on the weight and extending therefrom to the opposite side of the quadrant to form a guide for said weight, resilient means on the slide member to engage the weight and depressible means slidably carried by the slide member to engage said resilient means and disengage the latter from the weight.

3. Apparatus for testing hardness comprising a support, a drop-weight swingingly mounted thereon, means for reading the rebound of the weight, and a weight retaining member adjustably mounted on the support and comprising a slide member, a weight engaging spring, and a depressible pin to engage the spring upon depression of the pin to release the weight.

4. Apparatus for testing hardness comprising a drop-weight, means for suspending the weight as a pendulum, a pointer mounted on said weight, a curved bar formed as a graduated arc over which said pointer is adapted to move, a releasable holding device adapted to retain said weight in the raised position, said holding device being adjustably mounted on the curved bar, said bar also serving in conjunction with the pointer for indicating the extent of the rebound of the weight after striking the material to be tested.

In witness whereof, I have hereunto signed my name this 18th day of November 1910, in the presence of two subscribing witnesses.

JOSEF KIRNER.

Witnesses:
FRIEDRICH MEHL,
CARL RUPP.